United States Patent [19]

Kawamura

[11] Patent Number: 4,901,530
[45] Date of Patent: Feb. 20, 1990

[54] DEVICE FOR CONTROLLING TURBOCHARGER WITH ROTARY ELECTRIC MACHINE

[75] Inventor: Hideo Kawamura, Samukawa, Japan

[73] Assignee: Isuzu Motor Limited, Kanagawa, Japan

[21] Appl. No.: 200,585

[22] Filed: May 31, 1988

[30] Foreign Application Priority Data

May 30, 1987 [JP] Japan .................. 62-133455

[51] Int. Cl.4 ............................................. F02B 37/14
[52] U.S. Cl. ...................................................... 60/608
[58] Field of Search ........................... 60/597, 607, 608

[56] References Cited

U.S. PATENT DOCUMENTS

| 4,745,755 | 5/1988 | Kawamura | 60/608 |
| 4,757,686 | 7/1988 | Kawamura et al. | 60/608 |
| 4,774,811 | 10/1988 | Kawamura | 60/608 |

FOREIGN PATENT DOCUMENTS

| 0079100 | 5/1983 | European Pat. Off. . |
| 0178534 | 4/1986 | European Pat. Off. . |
| 0210833 | 2/1987 | European Pat. Off. . |
| 0212988 | 3/1987 | European Pat. Off. . |
| 0217537 | 4/1987 | European Pat. Off. . |
| 3539782 | 9/1985 | Fed. Rep. of Germany . |
| 2183337 | 12/1973 | France . |
| 62-48932 | 3/1987 | Japan . |

Primary Examiner—Michael Koczo
Attorney, Agent, or Firm—Staas & Halsey

[57] ABSTRACT

A device for controlling a turbocharger with a rotary electric machine detects, at all times, the rotational speed of an engine of a motor vehicle and an amount of depression of the accelerator pedal to monitor present running conditions of the motor vehicle. A required boost pressure subject to the running conditions is determined, and if a difference between the required boost pressure and a present boost pressure is greater than a prescribed value, the device determines that the motor vehicle is running under conditions which require quick acceleration. The device then drives the rotary electric machine coupled to the rotatable shaft of the turbocharger as a motor to increase the speed of rotation of the turbocharger for a quick buildup of the boost pressure.

9 Claims, 3 Drawing Sheets

DEVICE FOR CONTROLLING TURBOCHARGER WITH ROTARY ELECTRIC MACHINE

BACKGROUND OF THE INVENTION

The present invention relates to a device for controlling a turbocharger having a rotatable shaft on which a motor/generator rotary electric machine is mounted.

There have been proposed various systems in which a turbocharger is mounted on the exhaust pipe of an internal combustion engine of a motor vehicle and has a rotatable shaft to which a motor/generator is directly coupled for recovery of the energy of exhaust gases.

Japanese patent application Ser. No. 60-188827 discloses, as one such system, a device for controlling a turbocharger associated with an internal combustion engine to operate the motor/generator selectively as a generator or a motor dependent on the rotational speed of the engine and the load on the engine.

In the proposed device disclosed in the above application, when the motor/generator operates as a generator, an electric load or a battery is supplied with generated electric power, and when the motor/generator operates as a motor, the supercharging operation of the turbocharger is assisted to increase the output power of the engine. The earlier controlling device however does not have a means for optimizing the boost pressure of the turbocharger according to changes in the running conditions of the motor vehicle. Therefore, even when the motor vehicle is running under conditions which require quick acceleration, the turbocharger tends to suffer an insufficient boost pressure, and desired acceleration cannot be achieved.

SUMMARY OF THE INVENTION

It is an object of the present invention to provide a device for controlling a turbocharger with a rotary electric machine to obtain an optimum boost pressure according to the running conditions of a motor vehicle that is equipped with the turbocharger.

According to the present invention, there is provided a device for controlling a turbocharger with a rotary electric machine, comprising a turbine mounted on an engine of a motor vehicle and drivable by exhaust gases emitted from the engine, a rotatable shaft coupled to the turbine, a compressor coupled to the rotatable shaft for delivering air under pressure into the engine, a rotary electric machine coupled to the rotatable shaft, an engine speed sensor for detecting the rotational speed of the engine, an accelerator sensor for detecting an amount of depression of an accelerator pedal which controls operation of the engine, a boost pressure sensor for detecting the pressure of air supplied to the engine, a battery mounted on the motor vehicle, means for calculating a required boost pressure based on signals from the engine speed sensor and the accelerator sensor, and control means for driving the rotary electric machine as a motor and supplying electric power from the battery to the rotary electric machine if the difference between the required boost pressure and a boost pressure detected by the boost pressure sensor is greater than a prescribed value.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
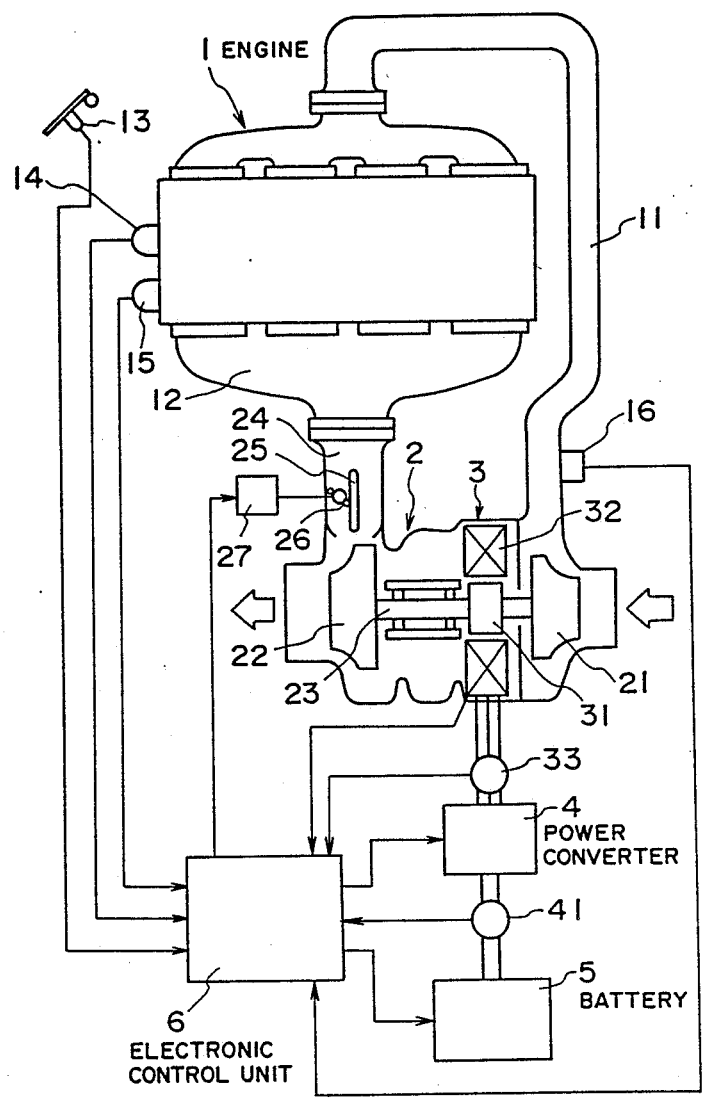
FIG. 1 is a block diagram of a device for controlling a turbocharger with a rotary electric machine according to the present invention.

FIG. 1 shows in block form a device for controlling a turbocharger with a rotary electric machine according to the present invention. FIG. 1 illustrates an internal combustion engine 1 which is operated by the energy produced by combusting supplied fuel with air drawn through an intake pipe 11 for driving a motor vehicle (not shown). Exhaust gases emitted from the engine 1 by such fuel combustion are discharged through an exhaust pipe 12. Denoted at 13 is an accelerator sensor for detecting the amount of depression of an accelerator pedal, 14 a load sensor for detecting the load on the engine 1 based on the position of a rack of a fuel injection pump (not shown) of the engine 1, and 15 an engine speed sensor for detecting the rotational speed of the engine 1. These sensors transmit detected signals to an electronic control unit 6 described later on.

A turbocharger 2 is coupled to the exhaust pipe 12 and the intake pipe 11. The turbocharger 2 has a turbine 22 drivable by exhaust gases and a compressor 21 for delivering intake air into the intake pipe 11. The turbine 22 and the compressor 21 are interconnected by a rotatable shaft 23 on which there is mounted a rotary electric machine 3 that is operable selectively as a motor or a generator. The turbocharger 2 has an exhaust gas inlet pipe 24 coupled to the exhaust pipe 12 and houses a partition 25 which is disposed in an exhaust passage for driving the turbine 22 to divide the exhaust passage into two passageways. An on/off valve 26 is disposed in one of the divided passageways. When the amount of exhaust gases is small, the on/off valve 26 is closed to increase the speed of flow of exhaust gases through the other passageway for driving the turbine 22 at high speed.

The rotary electric machine 3 has a rotor 31 which can be rotated by electric power supplied from a battery 5 through a power converter 4. When the rotor 31 is rotated, the compressor 21 operates to compress intake air and supercharge the engine 1 through the intake pipe 11. The boost pressure developed by the compressor 21 is detected by a boost pressure sensor 16 which transmits its detected signal to the electronic control unit 6.

The power converter 4 has power control circuits such as a rectifying/smoothing circuit for converting AC electric power into DC electric power, a converter circuit for converting the voltage of the DC electric power freely, an inverter circuit for converting the DC electric power into AC electric power with its frequency freely regulatable, and a duty factor control circuit for controlling the voltage or electric power with semiconductor control elements. The power converter 4 is electrically connected between the rotary electric machine 3 and the battery 5. The various power control circuits of the power converter 4 are controlled by commands from the electronic control unit 6.

The AC electric power from the rotary electric machine 3 operating as a generator is converted into DC electric power by the rectifying/smoothing circuit of the power converter 4, and the DC electric power is controlled by the converter circuit and the duty factor control circuit so as to be suitable for charging the battery 5. When the rotary electric machine 3 operates as a motor, the DC electric power from the battery 5 is converted by the converter and inverter circuits of the power converter 4 into AC electric power of a prescribed frequency and voltage which is supplied to a stator 32 of the rotary electric machine 3 for assisting the supercharging operation of the turbocharger that is driven by the exhaust gases.

Designated in FIG. 1 at 33 is an AC voltmeter for detecting the voltage across the stator 32 of the rotary electric machine 3, and 41 a DC voltmeter for detecting the DC terminal voltage of the power converter 4. Detected signals from these voltmeters 33, 31 are sent to the electronic control unit 6.

The electronic control unit 6 comprises a microcomputer having a central processing unit supplied with signals indicative of operating conditions of the engine 1 and signals from the voltmeters for effecting arithmetic operations and counting control occurrences, various memories for storing a map of data indicating the relationship between engine operating conditions and required boost pressures and a program for controlling operation of the rotary electronic machine, and an input/output device for receiving various input signals and issuing control commands to an actuator and the power converter. The voltage value of a counterelectromotive force induced in the stator 32 of the rotary electric machine 3 which operates in a motor mode is read into the electronic control unit 6.

Figure 2:
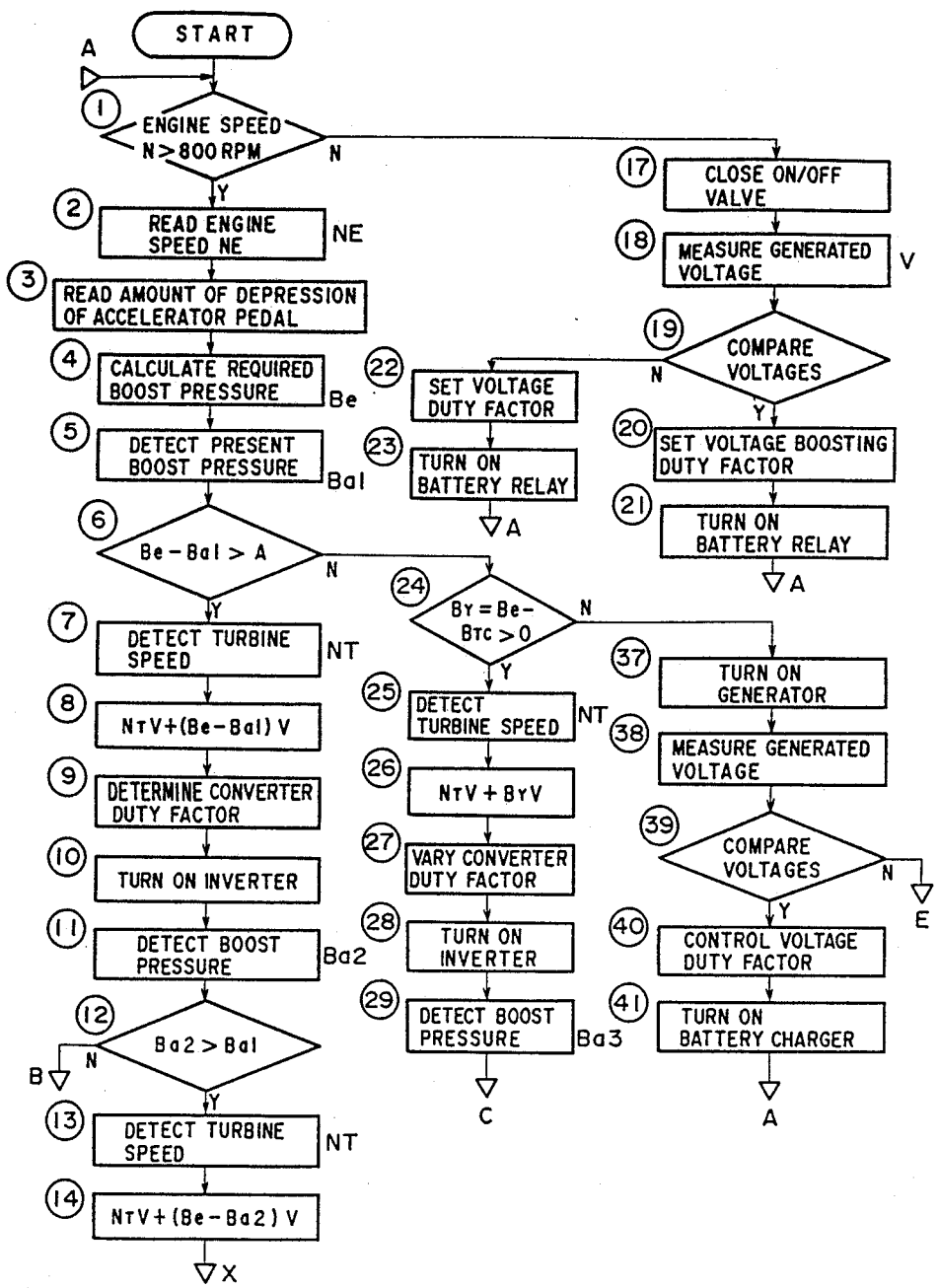
FIGS. 2(A) and 2(B) comprise a flowchart of operation for the controlling device according to the present invention.
Figure 2:
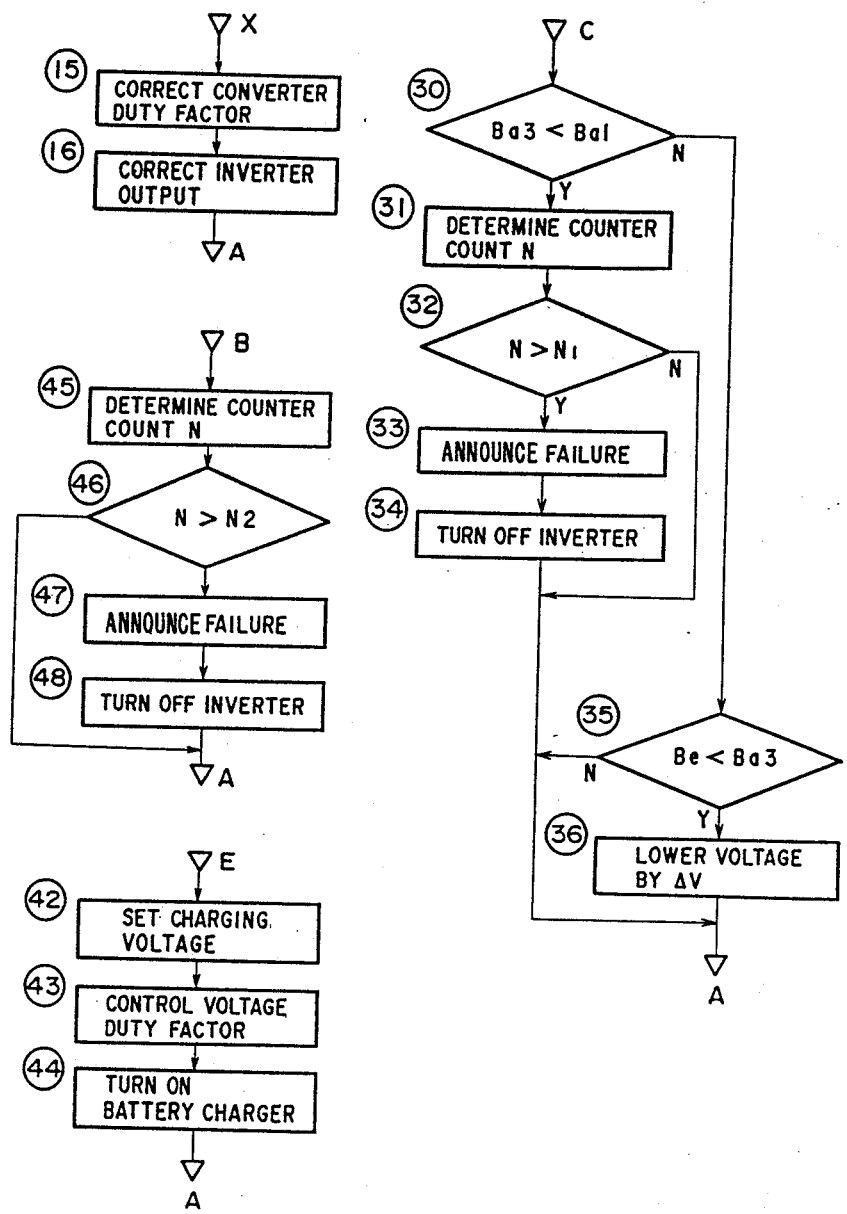

FIG. 2 is a flowchart of an operation sequence of the controlling device of the present invention. Operation of the controlling device will be described below with reference to FIG. 2.

A step 1 checks the rotational speed of the engine 1 based on a signal from the speed sensor 15. If the rotational speed is higher than 800 RPM, for example, then control goes to a step 2 in which an engine rotational speed NE is read. A step 3 then reads in the amount of depression of the accelerator pedal based on a signal from the accelerator sensor 13. Thereafter, a required boost pressure Be necessary to meet the running conditions indicated by the information read in steps 2 and 3 is calculated in a step 4. A step 5 detects the present boost pressure Bal from a signal from the boost pressure sensor 16, and then a step 6 detects whether the difference (Be−Bal) between the calculated required boost pressure Be and the detected present boost pressure Bal is higher than a prescribed value A. If (Be−Bal)>A, then since the motor vehicle requires quick acceleration, the turbocharger is controlled to quickly increase boost pressure up to the calculated required boost pressure Be in steps 7 through 16.

A step 7 detects the rotational speed NT of the turbine from the AC frequency of the rotary electric machine 3. A step 8 calculates a sum comprising electric power NTV produced at the turbine speed NT and electric power (Be−Bal)V corresponding to the difference (Be−Bal). The compressor 21 is driven by the sum electric power thus obtained thereby to achieve the calculated required boost pressure Be. More specifically, after the sum electric power has been calculated electric power from the battery 5 is controlled through duty factor control and supplied by the converter and the inverter circuits of the power converter 4 as the electric power (Be−Bal)V of a prescribed frequency to the rotary electric machine 3 (steps 9 and 10). Thereby rotation of the compressor 21 is assisted to increase the boost pressure. Then, an increased boost pressure Ba2 is detected from a signal from the boost pressure sensor 16 in a step 11.

A step 12 compares the boost pressures Ba2 and Bal. If the boost pressure Ba2 is higher than the boost pressure Bal, then the rotational speed of the turbine is detected in a step 13. The electric power from the battery 5 is corrected to obtain electric power (Be−Ba2)V corresponding to the boost pressure (Be−Ba2). The rotary electric machine 3 is driven by the corrected electric power to reach the boost pressure Be (steps 14 through 16).

If the engine rotational speed N is lower than 800 RPM in the step 1, then control jumps to a step 17 in which actuator 27 is operated to close the on/off valve 26 to increase the speed of flow of exhaust gases for increasing the speed of rotation of the turbocharger. In a next step 18, the voltage V generated by the rotary electric machine 3 at this time is measured. Then, the voltage V and the battery voltage VB are compared in a step 19. If V<VB, then the voltage boosting duty factor of the power converter 4 is determined in a step 20 to increase the generated voltage V higher than the battery voltage VB, after which a battery relay is turned on in a step 21 to charge the battery 5. If V>VB, then the generated voltage V is controlled to range from 12 to 14 V in a step 22, and the battery relay is turned on in a step 23 to charge the battery 5.

If the difference (Be−Bal) between the calculated required boost pressure Be and the detected present boost pressure Bal is smaller than the prescribed valve A in the step 6, then control goes to a step 24 which determines whether a difference BY produced by subtracting a characteristic boost pressure valve BTC from the calculated required boost pressure Be, is positive or negative. The characteristic boost pressure value BTC is a value of boost pressure which is a function of engine rotational speed corresponding to a characteristic torque curve of the turbocharger. If BY>0, then the turbine rotational speed NT is detected in a step 25. Then, electric power BY V is added to electric power NT V generated at the turbine rotational speed NT in a step 26. After the duty factor of the converter circuit is varied in a step 27, the rotary electric machine 3 is driven by the inverter circuit in a step 28. The boost pressure Bal should thus be increased. However, the boost pressure may not be increased when the accelerator pedal is suddenly released or the controlling device of the present invention malfunctions. Steps 29 through 34 confirm whether the accelerator is suddenly released or the controlling device malfunctions, and stop the operation of the inverter circuit if the accelerator pedal is suddenly released or the controlling device malfunctions. More specifically, a step 29 detects the boost pressure Ba3 after the turbocharger is assisted by the rotary electric machine 3, and a step 30 compares the boost pressures Bal, Ba3. If the boost pressure Ba3 is lower than the boost pressure Bal, then the count N of a counter is determined in a step 31. The count N and a prescribed count N1 are compared in a step 32. If N<N1, this means that the accelerator pedal which has been depressed is suddenly released. Thus, control returns to the step 1 to repeat the aforesaid cycle. If N>N1, this means that the boost pressure is not increased upon elapse of a certain period of time. The failure of the controlling device is announced by an alarm signal such as a buzzer or a lamp in a step 33, and the operation of the rotary electric machine through the inverter circuit is stopped in a step 34. If Ba3>Ba1 in the step 30, then a step 35 compares the required boost pressure Be and the boost pressure Ba3 after the rotary electric machine is driven by the inverter circuit. If Be<Ba3, then boost pressure has built up higher than the required boost pressure Be. Voltage regulation or frequency control is effected to lower the voltage by ΔV in a step 36 so that the boost pressure is reduced to the required boost pressure Be.

If BY is negative in the step 24, then boost pressure at the present engine speed is sufficient and no increase in the boost pressure is required. Consequently, the rotary electric machine 3 is operated as a generator in a step 37, the generated voltage V is measured in a step 38, and the generated voltage V and the battery voltage VB are compared in a step 39. If V>Vb, then the voltage is controlled through duty factor control in a step 40 and, the battery relay is turned on in a step 41 to charge the battery 5. If V<VB, then a charging voltage is selected in a step 42, the voltage is controlled through duty factor control in a step 43, and the battery relay is turned on in a step 44 to charge the battery 5.

If Ba2>Ba1 in the step 12, then boost pressure Ba1 occuring before the rotary electric machine is driven through the inverter circuit, is higher than the boost pressure Ba2 occuring after the rotary electric machine is driven through the inverter circuit. When this happens, the depressed accelerator pedal may have immediately been released, or the control device may have had a malfunction. A control sequence similar to that of the steps 31 through 34 is then carried out in steps 45 through 48. More specifically, the count N of a counter is determined in a step 45, and the count N and a prescribed count N2 are compared in a step 46. If N<N2, this means that the accelerator pedal which has been depressed is suddenly released. Thus, control returns to the step 1 to repeat the aforesaid cycle. If N>N2, this means that even upon elapse of a certain period of time after the rotary electric machine is driven by the inverter circuit, the boost pressure does not rise above the boost pressure Ba1, and the controlling device is malfunctioning. The failure of the controlling device is announced in a step 47, and the operation of the inverter circuit is stopped in a step 48.

With the present invention, as described above, the boost pressure of a turbocharger is checked at all times to achieve an optimum boost pressure which is required for quick acceleration according to running conditions of the motor vehicle. Therefore, the response of the engine is increased, making it possible to drive the motor vehicle through quick maneuvering efforts.

Although a certain preferred embodiment has been shown and described, it should be understood that many changes and modifications may be made therein without departing from the scope of the appended claims.

What I claim is:

1. A device for controlling a turbocharger of a motor vehicle engine having an accelerator pedal, comprising:
    a turbine mounted on the engine of the motor vehicle being drivable by exhaust gases emitted from the engine;
    a rotatable shaft coupled to said turbine;
    a compressor coupled to said rotatable shaft delivering air under pressure into the engine;
    a rotary electric machine coupled to said rotatable shaft;
    an engine speed sensor connected to the engine, detecting a rotational speed of the engine and providing a corresponding signal;
    an accelerator sensor connected to the accelerator pedal, detecting an amount of depression of the accelerator pedal and providing a corresponding signal;
    a boost pressure sensor connected to said compressor detecting a boost pressure of the air delivered to the engine;
    a battery mounted on the motor vehicle and connected to said rotary electric machine;
    means for calculating a required boost pressure based on the signals from said engine speed sensor and said accelerator sensor; and
    control means for driving said rotary electric machine as a motor and supplying electric power from said battery to said rotary electric machine if a difference between said calculated required boost pressure and the boost pressure detected by said boost pressure sensor is greater than a predetermined value.

2. A device according to claim 1, wherein said control means comprises:
    means for calculating a first value of electric power corresponding to a rotational speed of said turbine;
    means for calculating a second value of electric power corresponding to a value obtained by subtracting the boost pressure detected by said boost pressure sensor from said calculated required boost pressure; and
    means for adding said first and second calculated values of electric power to provide a sum of electric power to said rotary electric machine.

3. A device according to claim 1, wherein said control means comprises:
    means for calculating a characteristic boost pressure value of said turbocharger corresponding to the rotational speed of the engine when the difference between said calculated required boost pressure and the boost pressure detected by said boost pressure sensor is less than the predetermined value;
    means for calculating a first value of electric power corresponding to a rotational speed of said turbine when a value obtained by subtracting said calculated characteristic boost pressure value from said calculated required boost pressure is positive;
    means for calculating a second value of electric power corresponding to a value obtained by subtracting said calculated characteristic boost pressure value from said calculated required boost pressure; and
    means for adding said first and second calculated values to provide a sum of electric power to said rotary electric machine.

4. A device according to claim 1, further comprising:
    means for comparing a first boost pressure detected before said control means drives said rotary electric machine as a motor to a second boost pressure detected after said control means drives said rotary electric machine as a motor; and
    means for generating an alarm signal when said second boost pressure is lower than said first boost pressure.

5. A device according to claim 1, further comprising:
  means for comparing a first boost pressure detected before said control means drives said rotary electric machine as a motor, to a second boost pressure detected after said control means drives said rotary electric machine as a motor; and
  means for stopping said control means from driving said rotary electric machine as a motor when said second boost pressure is lower than said first boost pressure.

6. A device according to claim 1, having a voltage generated by said rotary electric machine and a voltage of said battery and further comprising:
  means for calculating a characteristic boost pressure value of said turbocharger corresponding to the rotational speed of the engine, based on the corresponding signal from said engine speed sensor; and
  means for operating said rotary electric machine as a generator if a value obtained by subtracting said calculated characteristic boost pressure value from said calculated required boost pressure is negative.

7. A device according to claim 6, wherein said means for operating said rotary electric machine as a generator comprises:
  means for comparing the voltage generated by said rotary electric machine and the voltage of said battery; and
  means for charging said battery if the voltage generated by said rotary electric machine is higher than the voltage of said battery.

8. A device according to claim 6, wherein said means for operating said rotary electric machine as a generator comprises:
  means for comparing the voltage generated by said rotary electric machine and the voltage of said battery; and
  means for selecting a charging voltage and charging said battery if the voltage generated by said rotary electric machine is lower than the voltage of said battery.

9. A device for optimizing boost pressure of an engine having an accelerator, according to running conditions, said device comprising:
  a turbocharger providing air with a boost pressure into the engine;
  a rotary electric machine coupled to said turbocharger being operable as a motor;
  means for detecting a speed of the engine, an amount of accelerator movement and a boost pressure of the turbocharger;
  means for calculating a required boost pressure on the basis of the detected speed of the engine and the detected amount of accelerator movement, a first difference between the required boost pressure and the detected boost pressure, a characteristic boost pressure value of said turbocharger corresponding to the detected speed of the engine, and a second difference between the required boost pressure and the characteristic boost pressure value; and
  means for operating said rotary electric machine as the motor in accordance with the first difference, the second difference and a predetermined difference value.

* * * * *

UNITED STATES PATENT AND TRADEMARK OFFICE
CERTIFICATE OF CORRECTION

PATENT NO. : 4,901,530

DATED : February 20, 1990

INVENTOR(S) : Hideo Kawamura

It is certified that error appears in the above-identified patent and that said Letters Patent is hereby corrected as shown below:

Front Page [73] Assignee, "Kanagawa" should be --Toyko--.

Col. 1, line 15, delete "Ser."

Col. 3, line 67, "calculated" should be --calculated, --.

Col. 4, line 4, "Thereby" should be --Thereby,--.

Col. 5, line 21, "V>Vb," should be --V>VB,-- line 22, "and," should be --and--.

Signed and Sealed this

Ninth Day of April, 1991

*Attest:*

HARRY F. MANBECK, JR.

*Attesting Officer*      *Commissioner of Patents and Trademarks*